(12) United States Patent
Kang et al.

(10) Patent No.: US 7,486,694 B2
(45) Date of Patent: Feb. 3, 2009

(54) MEDIA-GATEWAY CONTROLLER AND A CALL SET UP PROCESSING METHOD FOR NON-SAME CODEC COMMUNICATION

(75) Inventors: Tae Gyu Kang, Daejeon (KR); Seung Han Choi, Daejeon (KR); Hyun Joo Bae, Daejeon (KR); Do Young Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 817 days.

(21) Appl. No.: 10/749,597

(22) Filed: Dec. 30, 2003

(65) Prior Publication Data

US 2004/0264482 A1    Dec. 30, 2004

(30) Foreign Application Priority Data

Jun. 28, 2003    (KR)    ............ 10-2003-0042936

(51) Int. Cl.
*H04J 3/22*    (2006.01)
(52) U.S. Cl. .................. 370/466; 370/252; 370/401
(58) Field of Classification Search .......... 370/252, 370/352–356, 465, 466, 467, 401
See application file for complete search history.

(56) References Cited

U.S. PATENT DOCUMENTS 6,314,108 B1 *   11/2001   Ramasubramani et al. .. 370/465
6,597,702 B1 *   7/2003    Caugherty ................. 370/410

(Continued)

FOREIGN PATENT DOCUMENTS

| KR | 10-1997-0073812 | 12/1997 |
|----|-----------------|---------|
| KR | 10-1998-0027357 | 7/1998  |
| KR | P1999-0054055   | 7/1999  |
| KR | P2000-007834    | 2/2000  |
| KR | 2000-0074931    | 12/2000 |

OTHER PUBLICATIONS

G. Camarillo, et al., "Transcoding Services Invocation in the Session Initiation Protocol," Internet Engineering Task Force, SnowShore Networks, Columbia University, Ericsson, Nov. 4, 2002, pp. 1-19.

*Primary Examiner*—Firmin Backer
*Assistant Examiner*—Nguyen Ngo
(74) *Attorney, Agent, or Firm*—Blakely, Sokoloff, Taylor & Zafman LLP

(57) ABSTRACT

A media-gateway controller for call set-up processing when different codecs are used and a method therefor are provided. A storage unit stores a codec conversion table indicating a relationship between a first codec and a second codec in conversion from the first codec to the second codec. A receiver receives first call setting data including codec data of a caller from the caller and receives first call response data including codec data of a callee from the callee as a response to second call setting data having been transmitted to the callee. A data transformer searches the codec conversion table for a first codec using the caller's codec data as an index and adds a second codec corresponding to the searched first codec to the first call setting data to generate the second call setting data. In addition, the data transformer searches the codec conversion table for a second codec using the callee's codec data as an index and replaces the callee's codec data included in the first call response data with a first codec corresponding to the searched second codec to generate a second call response data. A transmitter transmits the second call setting data to the callee and transmits the second call response data to the caller.

9 Claims, 4 Drawing Sheets

U.S. PATENT DOCUMENTS

| | | | |
|---|---|---|---|
| 6,785,276 B1 * | 8/2004 | Valentine et al. | 370/391 |
| 7,136,375 B1 * | 11/2006 | Koistinen | 370/352 |
| 2003/0210659 A1 * | 11/2003 | Chu et al. | 370/320 |
| 2004/0037314 A1 * | 2/2004 | Spear | 370/466 |
| 2004/0047437 A1 * | 3/2004 | Hamiti et al. | 375/326 |
| 2005/0008030 A1 * | 1/2005 | Hoffmann et al. | 370/466 |

* cited by examiner

MEDIA-GATEWAY CONTROLLER AND A CALL SET UP PROCESSING METHOD FOR NON-SAME CODEC COMMUNICATION

This application claims the priority of Korean Patent Application No. 2003-42936, filed on Jun. 28, 2003, in the Korean Intellectual Property Office, the disclosure of which is incorporated herein in its entirety by reference.

BACKGROUND OF THE INVENTION

1. Field of the Invention

The present invention relates to a media-gateway controller for call set-up processing and a method therefor, and more particularly, to a media-gateway controller for call set-up processing when a codec used by a caller is different from that used by a callee, and a method therefor.

2. Description of the Related Art

A media-gateway controller generally links a packet network to an existing wired/wireless network. In other words, a media-gateway controller transmits a signal between different types of networks, processes a call, and controls a media-gateway such as an access gateway or a trunk gateway.

An access gateway is needed to connect a normal telephone user on a wired/wireless network such as a public switched telephone network (PSTN) to a packet network such as a Voice over Internet Protocol (VoIP) network or a Voice over Asynchronous Transfer Mode (VoATM) network. The access gateway converts voice data from a normal telephone to be suitable for the packet network.

A trunk gateway links a PSTN to a packet network such as a VoIP or VoATM network and allows a large amount of data from the PSTN to be transmitted to the packet network.

A media-gateway is a data transformer for data transmission between networks comforting to different standards. The media-gateway includes an access gateway and a trunk gateway.

A media-gateway control protocol (MEGACO) is used for communication between a media-gateway and a media-gateway controller in the Internet not in an existing PSTN or a wireless communication network. In the existing PSTN and wireless network, a call processing unit and a media device are physically mounted to a single apparatus. However, in the Internet, a media device is separated from a call processing unit according to standardization of the MEGACO.

In the conventional PSTN and wireless communication network, a predetermined codec is used in each network. Accordingly, a conventional media-gateway makes codec conversion between networks. The standard recommendation for conventional call setting is described in RFC 3261 SIP, RFC 3264 Offer/Answer SDP, RFC 2833 RTP Payload for DTMP digits, Telephony Tones and Telephony Signals, RFC 2327 SDP, RFC 3108 ATM SDP, RFC 1890 RTP Profile Payload Type, etc. of the Internet Engineering Task Force (IETF).

A procedure for transcoding, i.e., codec conversion, for people having speech or hearing defects is disclosed in "Transcoding Services Invocation in the Session Initiation Protocol" of the IETF (http://www.ieff.org/internet-drafts/draft-camarillo-sip-deaf-01.pdf). However, this procedure requires a change in call processing application software of a caller's or a callee's terminal and development of a transcoding server.

A structure for linking different wireless communication networks is disclosed in U.S. Pat. No. 6,314,108, in which transcoding is performed between terminals in different networks using different codecs on the premise that a single network uses a single codec. However, this transcoding cannot be employed when a network uses a different codec from an existing one.

A conventional media-gateway controller performing codec conversion between different networks cannot set a call when a caller and a callee in one network provide different codecs or when a caller or a callee uses a different codec from that of a network including the caller or the callee. Even if a call is set, voice communication is not accomplished.

SUMMARY OF THE INVENTION

The present invention provides a media-gateway controller for call set-up processing when a caller and a callee use different codecs, and a method therefor.

The present invention also provides a computer readable recording medium storing a program for executing in a computer a method of call set-up processing when a caller and a callee use different codecs.

According to an aspect of the present invention, there is provided a media-gateway controller including a storage unit, which stores a codec conversion table indicating a relationship between a first codec and a second codec in conversion from the first codec to the second codec; a receiver, which receives first call setting data including codec data of a caller from the caller and receives first call response data including codec data of a callee from the callee as a response to second call setting data having been transmitted to the callee; a data transformer, which searches the codec conversion table for a first codec using the caller's codec data as an index, adds a second codec corresponding to the searched first codec to the first call setting data to generate the second call setting data, searches the codec conversion table for a second codec using the callee's codec data as an index, and replaces the callee's codec data included in the first call response data with a first codec corresponding to the searched second codec to generate a second call response data; and a transmitter, which transmits the second call setting data to the callee and transmits the second call response data to the caller.

Preferably, the codec conversion table includes a field indicating a preference defined based on communication quality and data processing speed of each codec. When two or more second codecs are added to the first call setting data, the data transformer sorts the second codecs according to the preference. When the callee's codec data included in the first call response data is replaced with two or more first codecs, the data transformer sorts the first codecs according to the preference.

According to another aspect of the present invention, there is provided a method of call set-up processing, including receiving first call setting data including a caller's codec data from the caller; searching a codec conversion table, which indicates a relationship between a first codec and a second codec in conversion from the first codec to the second codec, for a first codec using the caller's codec data as an index and generating second call setting data by adding a second codec corresponding to the searched first codec to the first call setting data; transmitting the second call setting data to a callee; receiving first call response data including callee's codec data as a response to the second call setting data; searching the codec conversion table for a second codec using the callee's codec data as an index and generating second call response data by replacing the callee's codec data of the first call response data with a first codec corresponding to the searched second codec; and transmitting the second response data to the caller.

Accordingly, even when a caller and a callee use different codecs, call setting can be accomplished, and voice communication can also be accomplished since a media gateway performs codec conversion so that the caller and the callee can read each other's media data.

BRIEF DESCRIPTION OF THE DRAWINGS

The above and other features and advantages of the present invention will become more apparent by describing in detail preferred embodiments thereof with reference to the attached drawings in which.

DETAILED DESCRIPTION OF THE INVENTION

Hereinafter, preferred embodiments of the present invention will be described in detail with reference to the attached drawings.

Figure 1:
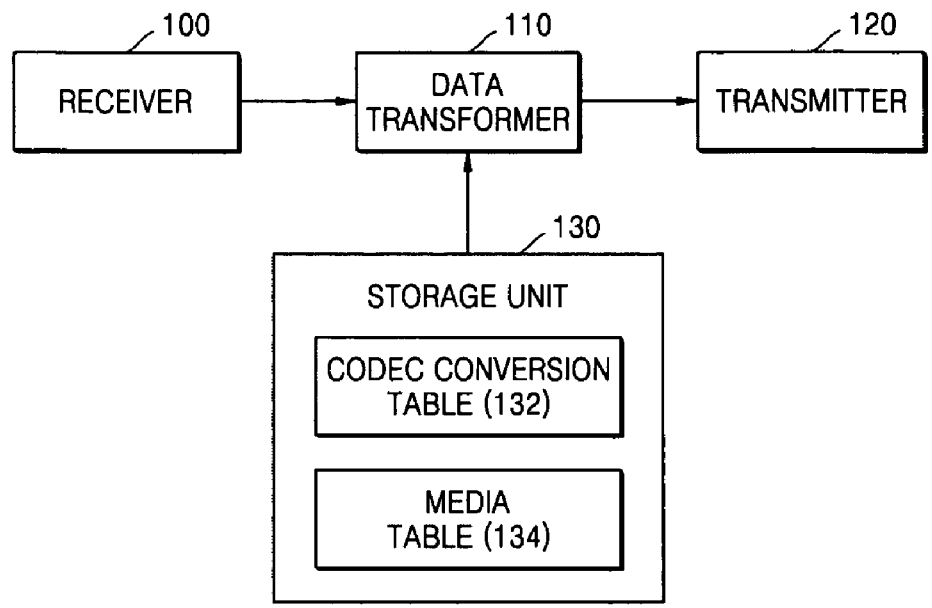
FIG. 1 is a block diagram of a media-gateway controller according to an embodiment of the present invention.

FIG. 1 is a block diagram of a media-gateway controller according to an embodiment of the present invention. The media-gateway controller includes a receiver 100, a data transformer 110, a transmitter 120, and a storage unit 130. The storage unit includes a codec conversion table 132 and a media table 134.

The receiver 100 receives call setting data from a caller. The call setting data includes codec data, that is, information on a codec used by the caller. The call setting data is received according to a Session Initial Protocol (SIP) or an H.323 protocol. The call setting data can be received according to a variety of protocols defined between the media-gateway controller and the caller.

In addition, the receiver 100 receives call response data from a callee. The call response data includes codec data, that is, information on a codec used by the callee. The call response data is a response to the call setting data that has been sent to the callee for call setting. The call response data is received according to Protocol No. 7. The call response data can be received according to a variety of protocols defined between the media-gateway controller and the callee.

Codec data included in each of the call setting data and the call response data may include information on two or more codecs. The codec data also includes information on an audio/video identifier, a channel, and a codec name.

The data transformer 110 searches the codec conversion table 132 of the storage unit 130 for a first codec 210 using the codec data included in the call setting data received by the receiver 100 as an index, and then reads a second codec 220 corresponding to the searched first codec 210. The first codec 210 is an input codec which a media-gateway can codec-convert. The second codec 220 is a codec output from the media gateway as a result of codec converting the first codec 210. When two or more second codecs 220 are read, they are sorted by preference 230 included in the codec conversion table 132.

The data transformer 110 searches the media table 134 for a codec type 310 using the second codec 220 that has been read and sorted as an index and reads codec data including a codec name 320, an audio/video identifier 330, a clock 340, and a channel 350. The data transformer 110 adds the read codec data to the call setting data.

In addition, the data transformer 110 searches the codec conversion table 132 for the second codec 220 using codec data included in the call response data received by the receiver 100 as an index and read the first codec 210 corresponding to the searched second codec 220. When two or more first codecs 210 are read, they are sorted by the preference 230 included in the codec conversion table 132. The data transformer 110 searches the media table 134 using the first codec 210 that has been read and sorted as an index and reads codec data including the codec name 320, the audio/video identifier 330, the clock 340, and the channel 350. The data transformer 110 replaces the codec data included in the call response data with the read codec data.

The codec conversion table 132 and the media table 134 can be stored in a single codec table. In other words, the codec name 320, the audio/video identifier 330, the clock 340, and the channel 350 which correspond to each of the first and second codecs 210 and 220 can be stored in a single codec table. A temporary storage table can be used to store the first codec 210, the second codec 220, and the preference 230 that have been read. When the temporary storage table is used, the data transformer 110 stores the read first and second codecs 210 and 220 in the temporary storage table according to the preference 230 and searches the media table 134 for codec data using the first or second codec 210 or 220 as an index. The codec conversion table 132 and the media table 134 will be later described in detail with reference to FIGS. 2 and 3.

The transmitter 120 transmits the call setting data transformed by the data transformer 110 to the callee. The callee receives the call setting data and transmits the call response data to the receiver 100.

The transmitter 120 also transmits the call response data transformed by the data transformer 110 to the caller. Since the transmitter 120 transmits the caller's codec data to the callee and the callee's codec data to the caller, each of the caller and the callee can acquire the other's coded data. In addition, the media-gateway controller can acquire the caller's codec data and the callee's codec data, and therefore, it can control the media gateway to perform codec conversion so that the caller and the callee can read each other's media data.

Each of the receiver 100 and the transmitter 120 may include a protocol processing unit which processes protocols such as an SIP, an H.323, a media-gateway control protocol (MEGACO), and a Media Gateway Control Protocol (MGCP) which exist above a Transmission Control Protocol (TCP), a User Datagram Protocol (UDP), and an Internet Protocol (IP); and a network interface processing unit which interfaces a 3GPP, a 3GPP2, an ATM, a PSTN, a WLAN, and an IP.

After call setting is completed, the caller receiving the call response data analyzes the codec data included in the call response data and transmits media data using a codec having the highest value of the preference 230 among codecs having the same codec data as that of the caller. The transmitted media data is converted by the media gateway, which is controlled by the media-gateway controller, using a codec that can be read by the callee and then transmitted to the callee. With such an operation, call setting and voice communication can be accomplished.

Figure 2:
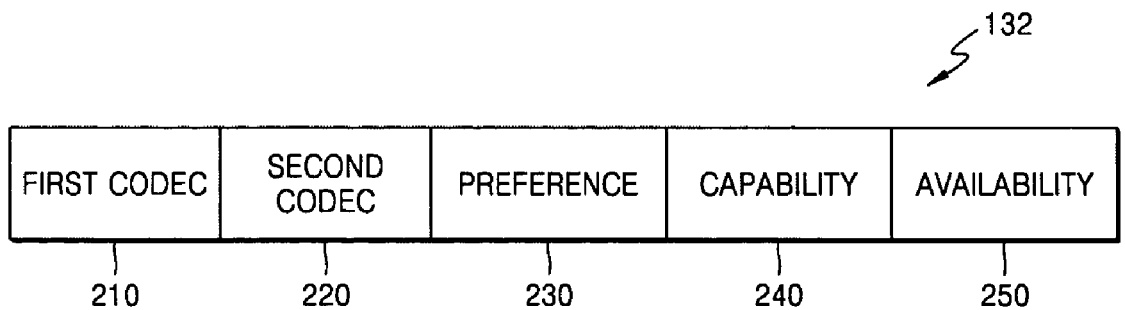
FIG. 2 is a diagram of an example of a codec conversion table according to the present invention.

FIG. 2 is a diagram of an example of a structure of the codec conversion table 132 included in the storage unit 130 according to the present invention. The codec conversion table 132 includes a first codec 210, a second codec 220, a preference 230, a capability 240, and an availability 250. The codec conversion table 132 includes a list of codecs that can be converted by a media gateway.

The first codec 210 indicates a codec that can be converted by a media gateway. The second codec 220 indicates a codec output form the media gateway as a result of converting the first codec 210.

The preference 230 is determined according to the communication quality and data a processing speed of a codec but may be determined according to other various criteria. Codec data of a caller and a callee are sorted by the preference 230.

The capability 240 indicates a maximum capacity of the media gateway to perform codec conversion. The availability 250 indicates a current available capacity of the media gateway to perform codec conversion.

Figure 3:
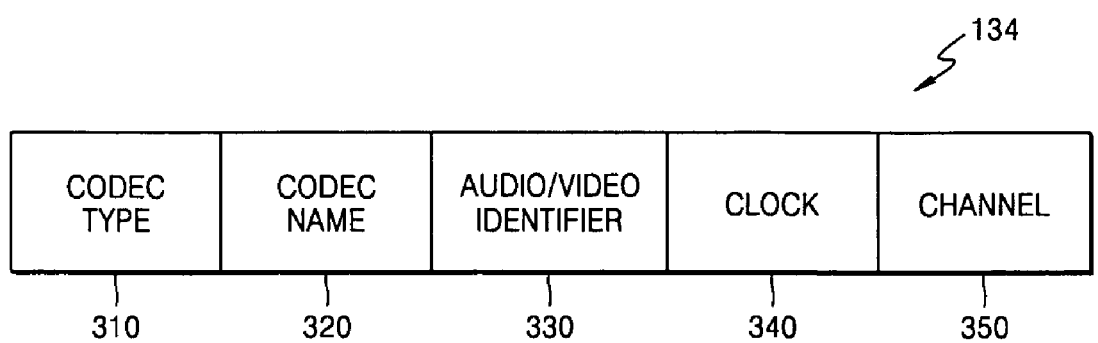
FIG. 3 is a diagram of a media table according to an embodiment of the present invention.

FIG. 3 is a diagram of a structure of the media table 134 according to an embodiment of the present invention. The media table 134 includes a codec type 310, a codec name 320, an audio/video identifier 330, a clock 340, and a channel 350.

The codec type 310 is a numeral value defining a codec. The codec name 320 is a name corresponding to the numeral value defining the codec. The audio/video identifier 330 is a value identifying whether media data is audio data or video data. The clock 340 indicates a clock rate of the media data. The channel 350 indicates the number of audio channels.

Table 1 is an example of the media table 134 in accordance with Standard Recommendation RFC 1890 of the Internet Engineering Task Force (IETF).

TABLE 1

| Codec Type | Codec Name | Audio/Video Identifier | Clock | Channel |
|---|---|---|---|---|
| 0 | PCMU | A | 8000 | 1 |
| 1 | 1016 | A | 8000 | 1 |
| 2 | G721 | A | 8000 | 1 |
| 3 | GSM | A | 8000 | 1 |
| 4 | unassigned | A | 8000 | 1 |
| 5 | DV14 | A | 8000 | 1 |
| 6 | DV14 | A | 16000 | 1 |
| 7 | LPC | A | 8000 | 1 |
| 8 | PCMA | A | 8000 | 1 |
| 9 | G722 | A | 8000 | 1 |
| 10 | L16 | A | 44100 | 2 |
| 11 | L16 | A | 44100 | 1 |
| 12 | unassigned | A | | |
| 13 | unassigned | A | | |
| 14 | MPA | A | 90000 | (see text) |
| 15 | G728 | A | 8000 | 1 |
| 16-23 | unassigned | A | | |
| 24 | unassigned | A | | |
| 25 | CelB | A | 90000 | |
| 26 | JPEG | A | 90000 | |
| 27 | unassigned | A | | |
| 28 | nv | A | 90000 | |
| 29 | unassigned | A | | |
| 30 | unassigned | AA | | |
| 31 | H261 | A | 90000 | |
| 32 | MPV | A | 90000 | |
| 33 | MP2T | AV | 90000 | |
| 34-71 | unassigned | ? | | |
| 72-76 | reserved | N/A | N/A | N/A |
| 77-95 | unassigned | ? | | |
| 96-127 | dynamic | ? | | |

Tables 2 through 5 show examples of call setting data and call response data.

Table 2 shows an example of call setting data when codec types 310 received from a caller using an SIP and a Session Description Protocol (SDP) are 0 and 97. In Table 2, "m=audio" means that a type of media data is audio. In "a=trpmap:0 PCMU/8000/1", "0" indicates a codec type, and "PCMU/8000/1" is data on a codec corresponding to a codec type of 0 in Table 1.

TABLE 2 m = audio 5456 RTP/AVP 0
a = rtpmap: 0 PCMU/8000/1
m = audio 49210 RTP/AVP 97
a = rtpmap: 97 AMR/8000/1
a = fmtp: 97 mode-set = 0, 2, 5, 7; mode-change-period = 2; mode-change-neighbot = 1
a = maxptime: 20

Table 3 shows an example of the call setting data shown in Table 2 after being transformed by the data transformer 110 when the first codec 210 is 0 (=PCMU) and the second codec 220 is 98 (AMR-WB) in the codec conversion table 132. Referring to Table 3, there are three codec types: a=rtpmap:0, r=rtpmap:97, and r=rtpmap:98. Codec data corresponding to each codec type shown in Table 1 is described.

TABLE 3 m = audio 5456 RTP/AVP 0
a = rtpmap: 0 PCMU/8000/1
m = audio 49210 RTP/AVP 97
a = rtpmap: 97 AMR/8000/1
a = fmtp: 97 mode-set = 0, 2, 5, 7; mode-change-period = 2; mode-change-neighbot = 1
a = maxptime = 20
m = audio 49120 RTP/AVP 98
a = rtpmap: 98 AMR-Wb/16000
a = fmtp: 98 octet-align = 1

Table 4 shows an example of call response data received from a callee. Referring to Table 4, since r=rtpmap:98 AMR-WB/16000, a codec type is 98. Codec data corresponding to the codec type 98 shown in Table 1 is described.

TABLE 4 m = audio 49120 RTP/AVP 98
a = rtpmap: 98 AMR-WB/16000
a = fmtp: 98 octet-align = 1

Table 5 shows an example of the call response data shown in Table 4 after being transformed by the data transformer 110 when the first codec 210 is 0 (=PCMU) and the second codec 220 is 98 (AMR-WB) in the codec conversion table 132. Referring to Table 5, the codec data of the call response data is converted to codec data corresponding to the codec type 0 corresponding to the codec type 98 of the second codec 220.

TABLE 5 m = audio 5456 RTP/AVP 0 1 3
99
a = rtpmap: 0 PCMU/8000

Figure 4A:
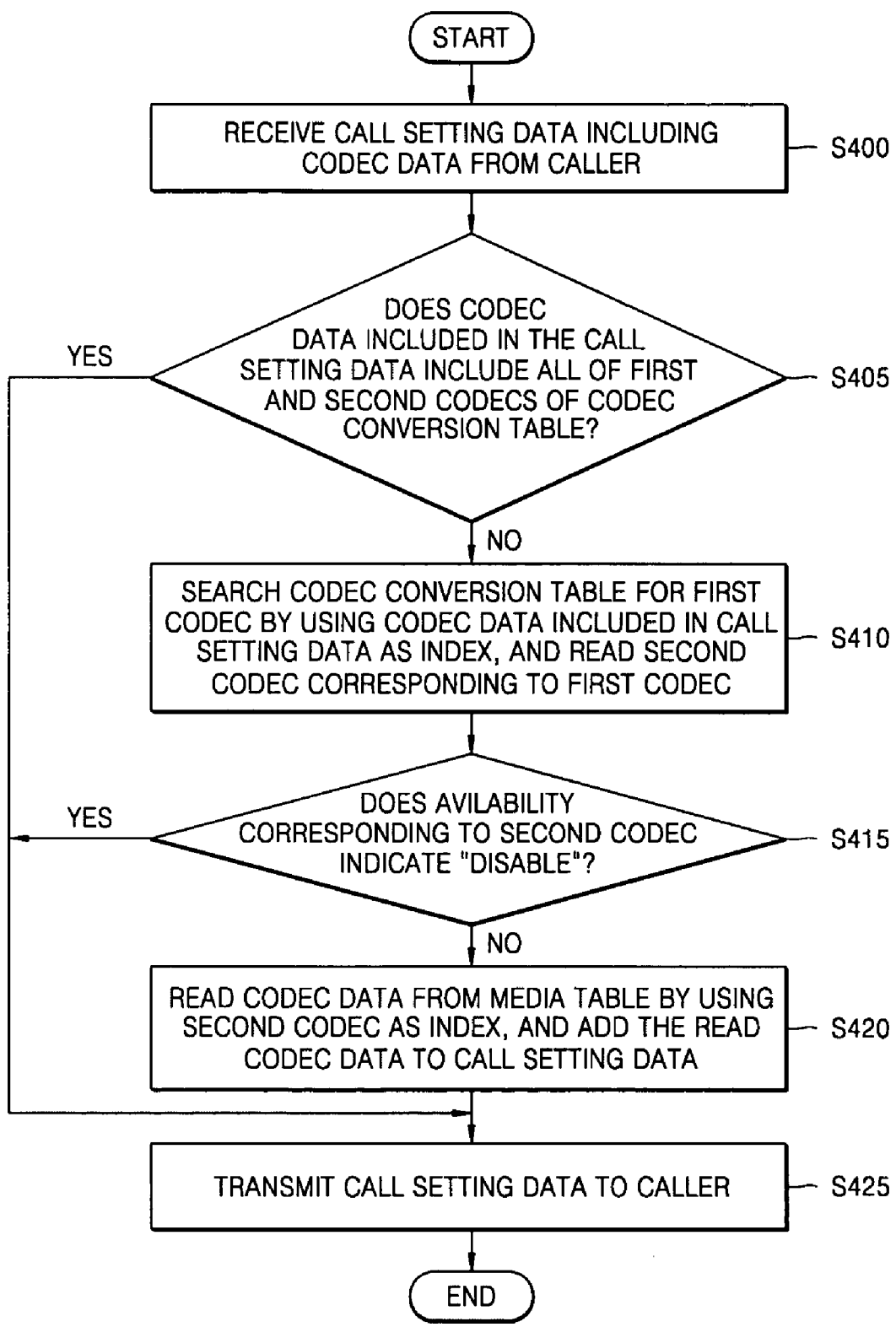
FIG. 4A is a flowchart of a method of call set-up processing according to an embodiment of the present invention.

FIG. 4A is a flowchart of a method of call set-up processing according to an embodiment of the present invention. In FIG. 4A, call setting data is received from a caller and then transmitted to a callee.

Referring to FIG. 4A, the receiver 100 of the media-gateway controller receives call setting data including codec data of a caller from the caller using an SIP and an SDP in step S400. Protocols other than the SIP and the SDP can be used between the media-gateway controller and the caller.

When it is determined that the codec data included in the call setting data includes all of the first codec 210 and the second codec 220 of the codec conversion table 132 stored in the storage unit 130 in step S405, the transmitter 120 transmits the call setting data that is not transformed to a callee in step S425. Since codec conversion is not needed when the codec data of the caller includes all codecs of the codec conversion table 132, the codec data of the caller is transmitted to the callee without being transformed.

When it is determined that the codec data included in the call setting data does not include all of the first codec 210 and the second codec 220 of the codec conversion table 132 stored in the storage unit 130 in step S405, the data transformer 110 searches the codec conversion table 132 for the first codec 210 using the codec data included in the received call setting data as an index and reads the second codec 220 corresponding to the searched first codec 210 in step S410.

When the availability 250 corresponding to the read second codec 220 indicates "disable", the data transformer 110 does not transform the received call setting data, and the transmitter 120 transmits the untransformed call setting data to the callee in step S425.

When the availability 250 corresponding to the read second codec 220 indicates "enable", the data transformer 110 searches the media table 134 stored in the storage unit 130 using the second codec 220 as an index, reads codec data including the codec name 320, the audio/video identifier 330, the clock 340, and the channel 350, and adds the read codec data to the call setting data in step S420. Next, the transmitter 120 transmits the transformed call setting data to the callee in step S425.

In the above description of a method of call set-up processing, it has been assumed that the codec data of the call setting data includes a single codec. The following description concerns a method of call set-up processing when codec data of call setting data includes two or more codecs.

The data transformer 110 searches the codec conversion table 132 for the first codec 210 using each codec included in codec data of call setting data as an index, reads the second codec 220 corresponding to the first codec 210, and sorts a plurality of second codecs 220 that have been read based on the preference 230 stored in the codec conversion table 132. The data transformer 110 reads codec data including the codec name 320, the audio/video identifier 330, the clock 340, and the channel 350 from the media table 134 using as an index each of second codecs 220 other than second codecs 220 having the availability 250 indicating "disable" and adds the read codec data to the call setting data. The transmitter 120 transmits the transformed call setting data to a callee.

Figure 4B:
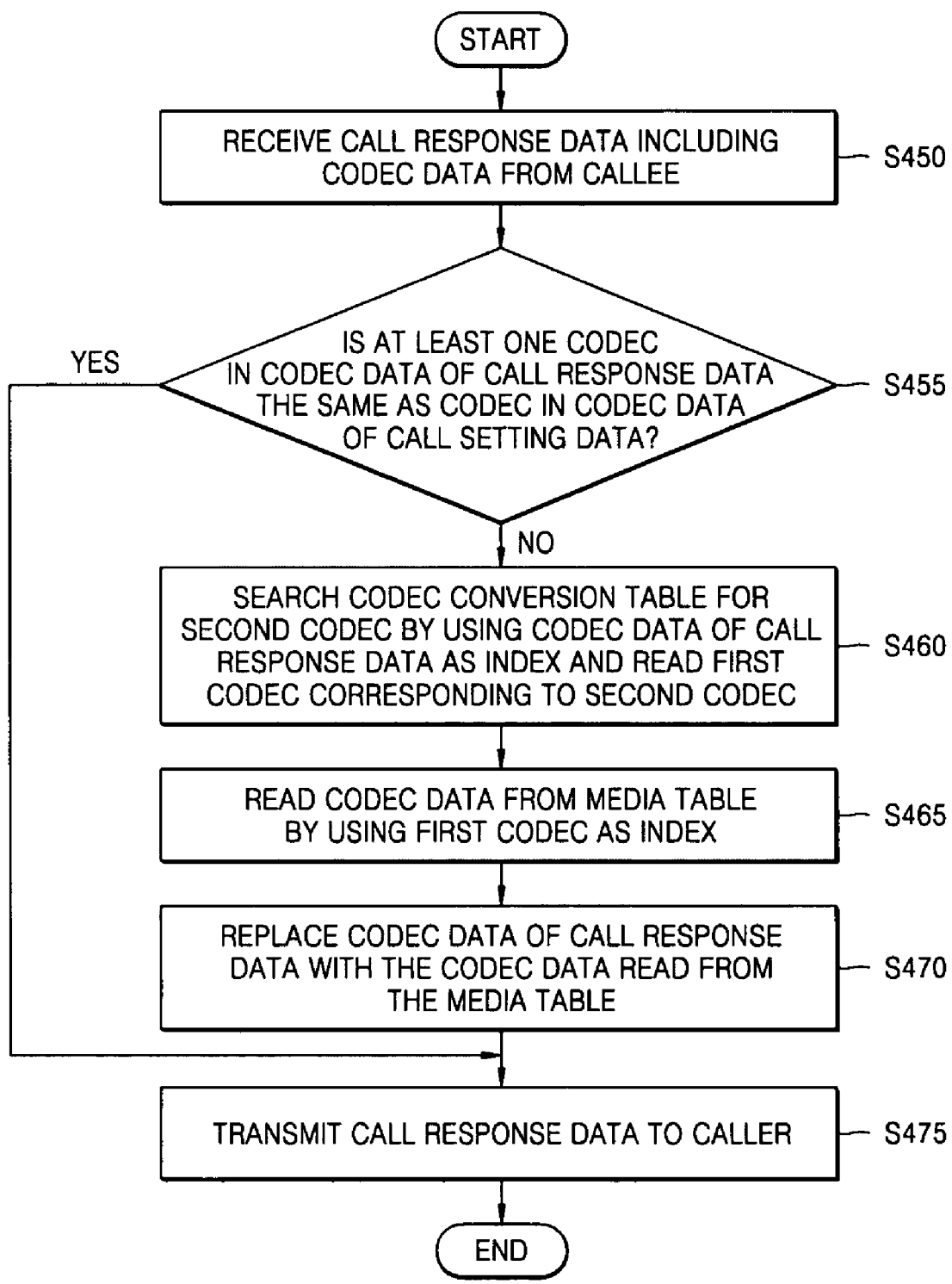
FIG. 4B is a flowchart of a method of call set-up processing according to another embodiment of the present invention.

FIG. 4B is a flowchart of a method of call set-up processing according to another embodiment of the present invention. In FIG. 4B, call response data is received from a callee and then transmitted to a caller.

Referring to FIG. 4B, the receiver 100 receives call response data including codec data of a callee as a response to call setting data that the transmitter 120 has transmitted to the callee in step S450. Here, when two or more codecs exist in the codec data of the call response data, the codecs are sorted based on the codec sequence in codec data of the call setting data. In other words, when some of the codecs in the codec data of the call response data are the same as codecs in the codec data of the call setting data, the codecs are sorted in the same sequence as those in the codec data of the call setting data.

When it is determined that at least one codec in the codec data of the call response data is the same as a codec in the codec data of the call setting data in step S455, the data transformer 110 does not transform the call response data, and the transmitter 120 transmits the untransformed call response data to the caller in step S475.

When it is determined that no codec in the codec data of the call response data is the same as a codec in the codec data of the call setting data in step S455, the data transformer 110 searches the codec conversion table 132 for the second codec 220 using the codec data of the call response data as an index and reads the first codec 210 corresponding to the searched second codec 220 in step S460. Next, the data transformer 110 reads codec data including the codec name 320, the audio/video identifier 330, the clock 340, and the channel 350 from the media table 134 using the read first codec 210 as an index in step S465 and replaces the codec data of the call response data with the codec data read from the medial table 134 in step S470. Next, the transmitter 120 transmits the transformed call response data to the caller in step S475.

After receiving the call response data, the caller transmits media data using a codec corresponding to the codec data included in the call response data. The media data transmitted from the caller is converted by the media gateway controlled by the media gateway controller so that the media data can be read by a codec of the callee, and then transmitted to the callee. As a result, even if the caller and the callee do not have the same codec, call setting and voice communication can be accomplished.

In the above description of a method of call set-up processing, it has been assumed that the codec data of the call response data includes a single codec. The following description concerns a method of call set-up processing when codec data of call response data includes two or more codecs.

The data transformer 110 searches the codec conversion table 132 for the second codec 220 using each codec included in codec data of the call response data as an index, reads the first codec 210 corresponding to the second codec 220, and sorts a plurality of first codecs 210 that have been read based on the preference 230 stored in the codec conversion table 132. The data transformer 110 reads codec data including the codec name 320, the audio/video identifier 330, the clock 340, and the channel 350 from the media table 134 using each of the first codecs 210 as an index and replaces the codec data of the call response data with the codec data read from the media table 134. The transmitter 120 transmits the transformed call response data to a caller.

Figure 5:
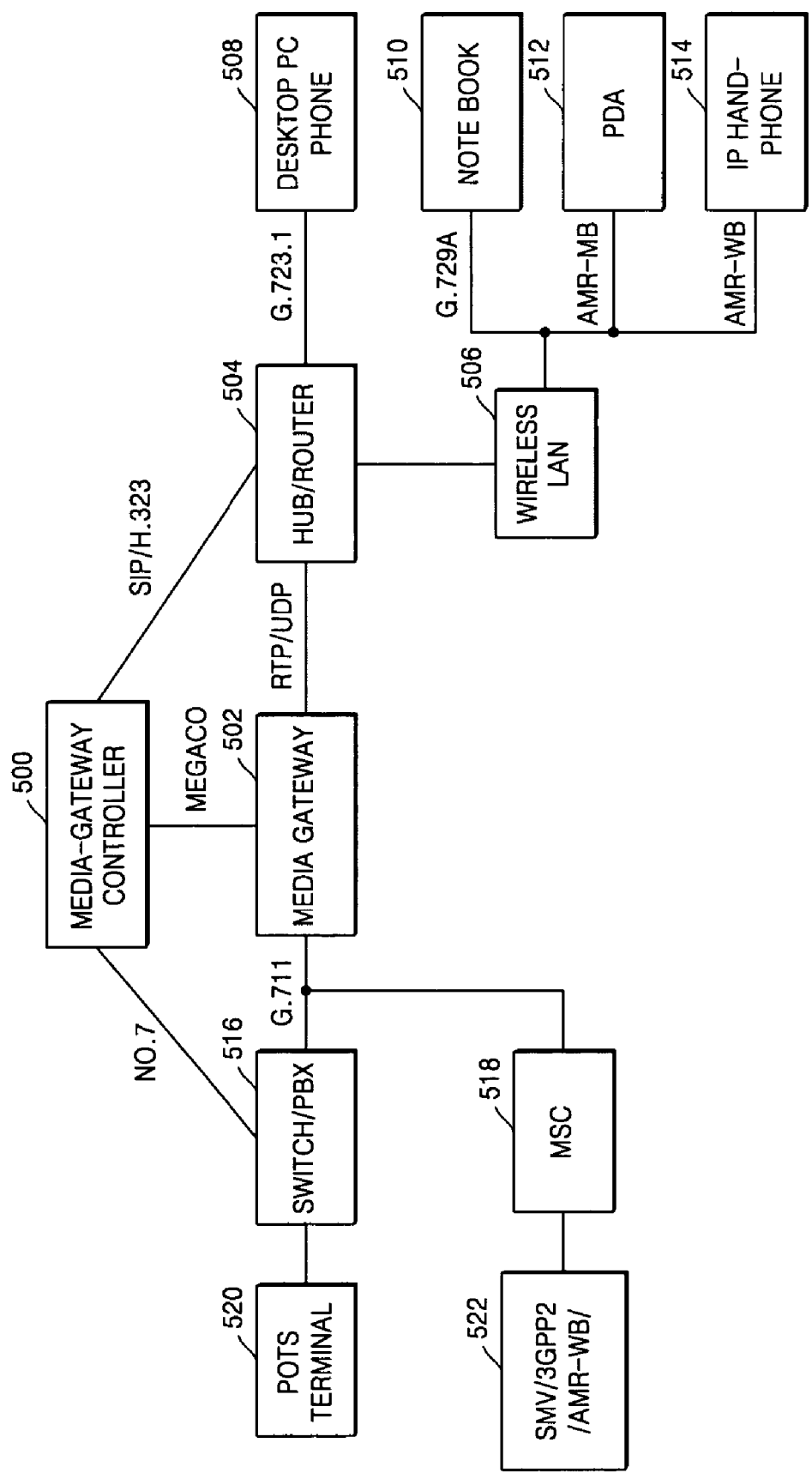
FIG. 5 is a diagram of an example of a code conversion system using a media-gateway controller according to the present invention.

FIG. 5 is a diagram of an example of a code conversion system using a media-gateway controller according to the present invention. The codec conversion system includes a media-gateway controller 500, a media gateway 502, a hub/router 504, a wireless local area network (LAN) 506, a switch/private branch exchange (PBX) 516, a mobile switch center (MSC) 518, and a variety of terminals 508, 510, 512, 514, 520, and 522.

The terminals include a desktop PC phone 508, a notebook 510, a personal digital assistant (PDA) 512, and an IP handphone 514, which are connected through the wireless LAN 506, a wireless communication terminal 522 connected through the MSC 518, and a plain old telephone service (POTS) terminal 520 connected through the switch/PBX 516.

The terminals 508, 510, 512, and 514 accessing the Internet through various paths of network equipment request the media-gateway controller 500 to provide an Internet voice telephone service. In response to such a request, the media-gateway controller 500 sets a call. After an Internet telephone call is connected, the media-gateway controller 500 controls the media gateway 502, which transmits data to the terminal 520 through the switch/PBX 516 or to the wireless terminal 522 having one of codecs SMV, 3GPP2, and AMR-WB through the MSC 518. The media gateway performs codec conversion in an environment where networks and terminals use different codecs such as G.711, G.723.1, SMV, AMR-NB, and AMR-WB. Consequently, voice communication between different terminals can be accomplished.

The present invention can be realized as a code which is recorded on a computer readable recording medium and can be read by a computer. The computer readable recording medium may be any type of medium on which data which can be read by a computer system can be recorded, for example, a ROM, a RAM, a CD-ROM, a magnetic tape, a hard disc, a floppy disc, a flash memory, or an optical data storage device. Alternatively, computer readable recording media are distributed among computer systems connected through a network so that the present invention can be realized as a code which is stored in the recording media and can be read and executed in the computers.

According to the present invention, call setting can be accomplished even when a caller and a callee use different codecs, and voice communication can also be accomplished by codec conversion by a media gateway. In addition, under an Internet telephone environment where various codecs are used unlike an existing network using a single codec, the present invention makes call setting and voice communication possible when a caller and a callee use different codecs. The present invention can provide codec conversion between a single caller and one or more callee as well as codec conversion between networks.

Although a few embodiments of the present invention have been shown and described, it will be appreciated by those skilled in the art that changes may be made in these elements without departing from the principles and spirit of the invention, the scope of which is defined in the appended claims and their equivalents.

What is claimed is:

1. A media-gateway controller comprising:
   a storage unit, which stores a codec conversion table indicating a relationship between a first codec and a second codec in conversion from the first codec to the second codec;
   a receiver, which receives first call setting data including codec data of a caller from the caller and receives first call response data including codec data of a callee from the callee as a response to second call setting data having been transmitted to the callee;
   a data transformer, which searches the codec conversion table for a first codec using the caller's codec data as an index, adds a second codec corresponding to the searched first codec to the first call setting data to generate the second call setting data, searches the codec conversion table for a second codec using the callee's codec data as an index, and replaces the callee's codec data included in the first call response data with a first codec corresponding to the searched second codec to generate a second call response data;
   a transmitter, which transmits the second call setting data to the callee and transmits the second call response data to the caller; and
   wherein the codec conversion table comprises a field indicating a preference defined based on communication quality and data processing speed of each codec,
   when two or more second codecs are added to the first call setting data, the data transformer sorts the second codecs according to the preference, and
   when the callee's codec data included in the first call response data is replaced with two or more first codecs, the data transformer sorts the first codecs according to the preference.

2. The media-gateway controller of claim 1, wherein the callee's codec data included in the first call response data is sorted according to a sequence of the caller's codec data.

3. The media-gateway controller of claim 1, wherein when the caller's codec data included in the first call setting data comprises all of first and second codecs included in the codec conversion table, the data transformer does not transform the first call setting data and generates the second call setting data which is the same as the first call setting data.

4. The media-gateway controller of claim 1, wherein when at least one codec included in the callee's codec data in the first call response data is the same as a codec included in the caller's codec data in the first call setting data, the data transformer does not transform the first call response data and generates the second call response data which is the same as the first call response data.

5. A method of call set-up processing, comprising:
   (a) receiving first call setting data including a caller's codec data from the caller;
   (b) searching a codec conversion table, which indicates a relationship between a first codec and a second codec in conversion from the first codec to the second codec, for a first codec using the caller's codec data as an index and generating second call setting data by adding a second codec corresponding to the searched first codec to the first call setting data;
   (c) transmitting the second call setting data to a callee;
   (d) receiving first call response data including callee's codec data as a response to the second call setting data;
   (e) searching the codec conversion table for a second codec using the callee's codec data as an index and generating second call response data by replacing the callee's codec data of the first call response data with a first codec corresponding to the searched second codec;
   (f) transmitting the second response data to the caller;
   wherein the codec conversion table comprises a field indicating a preference defined based on communication quality and data processing speed of each codec,
   step (b) comprises sorting a plurality of second codecs corresponding to the searched first codec according to the preference and adding the sorted second codecs to the first call setting data, and
   step (e) comprises sorting a plurality of first codecs corresponding to the searched second codec according to the preference and replacing the callee's codec data of the first call response data with the sorted first codecs.

6. The method of claim 5, wherein the callee's codec data of the first call response data is sorted according to a sequence of codec data of the first call setting data.

7. The method of claim 5, wherein step (b) comprises generating the second call setting data which is the same as the first call setting data without transforming the first call setting data when the caller's codec data included in the first call setting data comprises all of first and second codecs included in the codec conversion table.

8. The method of claim 5, wherein step (e) comprises generating the second call response data which is the same as the first call response data without transforming the first call response data when at least one codec included in the callee's codec data in the first call response data is the same as a codec included in the caller's codec data in the first call setting data.

9. A computer readable recording medium having recorded thereon a program for performing in a computer a method of call set-up processing, the method comprising:

receiving first call setting data including a caller's codec data from the caller;

searching a codec conversion table, which indicates a relationship between a first codec and a second codec in conversion from the first codec to the second codec, for a first codec using the caller's codec data as an index and generating second call setting data by adding a second codec corresponding to the searched first codec to the first call setting data;

transmitting the second call setting data to a callee;

receiving first call response data including callee's codec data as a response to the second call setting data;

searching the codec conversion table for a second codec using the callee's codec data as an index and generating second call response data by replacing the callee's codec data of the first call response data with a first codec corresponding to the searched second codec;

transmitting the second response data to the caller; and wherein the codec conversion table comprises a field indicating a preference defined based on communication quality and data processing speed of each codec, when two or more second codecs are added to the first call setting data, sorting the second codecs according to the preference, and when the callee's codec data included in the first call response data is replaced with two or more first codecs, sorting the first codecs according to the preference.

\* \* \* \* \*